C. H. Trumbull,
Tree Protector.
No. 110,091. Patented Dec. 13, 1870.
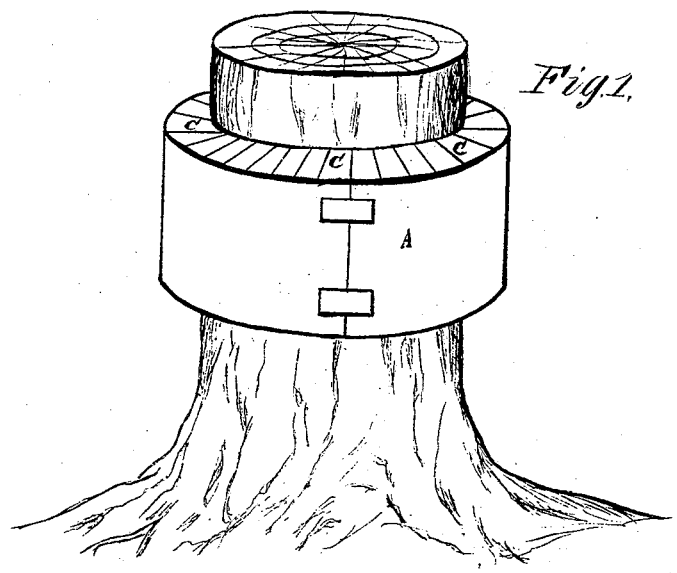
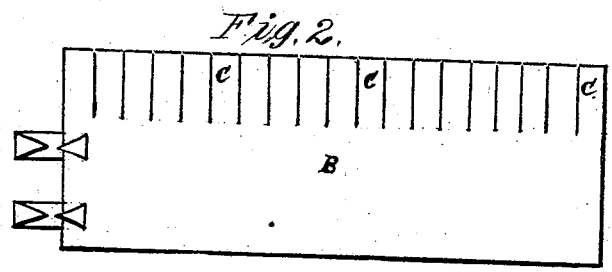

United States Patent Office.

CHARLES HENRY TRUMBULL, OF MARION, NEW YORK.

Letters Patent No. 110,091, dated December 13, 1870.

IMPROVEMENT IN TREE-PROTECTORS.

The Schedule referred to in these Letters Patent and making part of the same.

I, CHARLES HENRY TRUMBULL, of Marion, in the county of Wayne, in the State of New York, have invented certain Improvements in Tree-Protectors, of which the following is a specification.

My invention relates to the construction of a flexible plate of tin or other suitable material in such a manner that, when bent around the tree, it will form an annular inverted box, which may be readily adapted to the inequalities of the trunk of said tree, and securely held in position—

The object of my invention being to furnish a simple, cheap, and effective device that may be more generally enjoyed by the public than those now in ordinary use.

Figure 1 in the accompanying drawing represents the device embodying my invention attached to a tree.

Figure 2 shows the unbent plate with its upper edge cut into sections for forming the top, or that part of the device which comes in contact with the tree.

The annular box A is formed by the plate B, which should be made of sufficient width for the required depth of the box, leaving a margin to form the top, which is accomplished by cutting said margin into transverse sections, C C C, and bending them either to a right or acute angle with the plate B, which is then bent in a circular form to the required diameter, said sections interlying upon each other in proportion as they approach to a right angle with the trunk of the tree.

As the sections C C C are cut to the full width of the margin of the plate B its flexibility is not impaired by the bending of said sections to the required angle, and may be readily fitted to a tree of any regular or irregular form or size, and secured by locking the ends by a clasp or other convenient means, thereby forming an annular inverted box, A, the rim of which extends from the body of the tree to the width of the cutting of the sections or margin of the plate B or top of the box, which may be made "water-proof" by any of the substances used for similar purposes.

The inner surface may be coated with a suitable coating to prevent the progress of the insect.

I am aware that collars or flanges, having their inner edges cut in sections, have been applied to the trunks of trees before, but they have never been made of rectangular pieces or strips, which possess many advantages over the circular or sector pieces which are usually employed for that purpose, such as economy in cutting out, as they do not waste the material; in the fact that they can be made in strips of any length, and then cut to fit the size of the tree; and also, that the side of the box can be readily made perpendicular, that is, parallel with the trunk of the tree, which greatly increases the difficulty of the insect in traversing the side of the box.

Claim.

I claim as my invention—

The tree-protector A, constructed and applied substantially as and for the purpose set forth.

CHARLES HENRY TRUMBULL.

Witnesses:
EMMONS MANLEY,
C. C. HUGGINS.